United States Patent Office 3,455,825
Patented July 15, 1969

3,455,825
OLEAGINOUS COMPOSITIONS
Franklin I. L. Lawrence, Bradford, and Michael J. Pohorilla, Berwyn, Pa., assignors to Kendall Refining Company, a corporation of Pennsylvania
No Drawing. Continuation-in-part of application Ser. No. 540,159, Oct. 12, 1955. This application Mar. 25, 1966, Ser. No. 537,327
Int. Cl. C10m 1/18, 5/14
U.S. Cl. 252—28                                19 Claims

ABSTRACT OF THE DISCLOSURE

An oleaginous composition is provided having a boiling point in excess of 400° F. and a flash point in excess of 200° F. containing a viscosity index improving amount of a hydrocarbonaceous condensation product having a combined oxygen content not in excess of 5% by weight, said condensation product being produced by contacting a resinous hydrocarbon derived from a mineral oil having a bromine number less than 10, not less than 2 naphthenic rings per molecule, not more than 50% aromatic carbon per molecule, not more than 10% wax hydrocarbon material and having a molecular weight in excess of 500 with free oxygen at 400° F. for a time sufficient to produce a product having a viscosity at least 500 SUS higher than the starting material.

---

This application is a continuation-in-part of our application Ser. No. 540,159, filed Oct. 12, 1955, now abandoned.

This invention relates to the improvement of the viscosity index, detergency, and depression of the pour point of oleaginous compositions including lubricating oils, greases, power transmission fluids, and shock absorber fluids, which are characterized by a boiling point in excess of 400° F. and a flash point in excess of 200° F. More particularly, the invention embraces lubricating oils, greases, power transmission fluids, and shock absorber fluids, of the aforementioned type, which contain viscosity index improving amounts of substantially oil compatible hydrocarbonaceous condensation products formed by contacting a hydrocarbon starting material having a molecular weight in excess of about 500 while at a temperature of at least about 400° F., for example, about 400° F. to about 600° F., with a free oxygen-containing gas.

The wide use of automobiles, aircraft, and other types of machines and apparatus, which are operated through widely varying temperature ranges requires lubricating oils, greases, power transmission fluids, and shock absorber fluids which have a boiling point in excess of 400° F. and a flash point in excess of 200° F., and which are further attended by superior viscosity-temperature characteristics. Materials known to the art to have the necessary boiling and flash points, such as mineral oil fractions, demonstrate excessive variations in viscosity with temperature. Ideally, the viscosity of lubricating oils, power transmission fluids, and shock absorber fluids, would be substantially constant throughout wide ranges of temperature. The art has, therefore, sought to combine appropriate additives with lubricating oils, greases, power transmission fluids, and shock absorber fluids, to improve the viscosity index thereof.

It is a primary object of this invention to provide compounded lubricating oils, greases, power transmission fluids, and shock absorber fluids of improved viscosity index.

It is an additional object of the invention to provide compositions effective as viscosity index improving agents and detergents for oleaginous compositions, such as lubricating oils, greases, power transmission fluids, and the like, which are resistant to oxidation.

It is yet another object of the invention to provide lubricating oils, greases, power transmission fluids, and shock absorber fluids which are compounded with additive materials effective to simultaneously improve the viscosity index and depress the pour point thereof.

In accordance with this invention, there are provided compounded oleaginous compositions including lubricating oils, greases, power transmission fluids, and shock absorber fluids having a boiling point in excess of 400° F. and a flash point in excess of 200° F. containing a viscosity index improving amount of a substantially oil compatible hydrocarbonaceous condensation product having a combined oxygen content not in excess of about 5% by weight, said condensation product being produced by contacting a hydrocarbon starting material having a molecular weight in excess of about 500, while at a temperature of at least about 400° F., preferably about 425° F. to 575° F., with a free oxygen-containing gas, for a time period requisite to produce a final product effective in a concentration of about 10% by weight to increase the viscosity index of a 60 at 100 SUS standard base mineral oil derived from a paraffinic crude source at least 10 viscosity index units more than a like amount of the hydrocarbon starting material from which said condensation product is formed.

The viscosity index improving agents of this invention are usually characterized by a ring and ball softening point, as measured by A.S.T.M. method E 28–42T, of more than about 80° F. Some viscosity index improving agents comprehended by the invention have a ring and ball softening point or viscosity too low to be effectively measured in accordance with the aforementioned procedure. Such materials are characterized by a viscosity of at least about 700 SUS at 210° F., preferably at least about 2000 to 5000 SUS at 210° F. and, in any event, a viscosity of at least about 500 SUS at 210° F. greater than the hydrocarbon starting materials from which the viscosity index improving agents are produced.

The substantially oil compatible hydrocarbonaceous condensation products which constitute the viscosity index improving agents of this invention appear to result from the chain reaction of free radical intermediates which are formed thermally or by the reaction of at least some of the molecules of the hydrocarbon starting materials with oxygen. The high molecular weight condensation products which are contemplated as viscosity index improvers by the invention contain a small amount, not in excess of 5% by weight of chemically combined oxygen and, therefore, are different in kind from products such as those resulting from the relatively low temperature air oxidation of paraffin waxes which, as the art has recognized, are essentially highly oxygenated compounds, generally of relatively low molecular weight, such as carboxylic acids, hydroxycarboxylic acids, lactones, ketones, and the like.

Any free oxygen-containing gas can be employed in the production of the viscosity index improving agents of the invention. Air is preferred. Substantially pure gaseous oxygen can be employed. Gaseous oxygen in combination with diluents inert under the conditions, such as nitrogen, carbon dioxide, and the like, can be employed.

The rate of supply of free oxygen-containing gas to the reaction mixture is not critical to the production of the viscosity index improving agents of the invention. Generally, the free oxygen-containing gas is passed through the condensation reaction mixture at a rate requisite to provide at least about 10 cubic feet of free oxygen per gallon of hydrocarbon starting material per hour. Preferably, the free oxygen-containing gas is supplied to the reaction mixture at a rate of from about 11 to 27 cubic feet per hour per gallon of hydrocarbon starting material. The corresponding air rates are at least about 50 cubic feet of air per hour per gallon of hydrocarbon starting material, the preferred range being from about 55 to about 135 cubic feet per hour per gallon of hydrocarbon starting material. Reactive materials, such as chlorine, hydrogen chloride, phosphorus pentoxide, and like materials, which serve as activators can appropriately be introduced into the reaction mixture in conjunction with the free oxygen-containing gas. Conventional catalysts known to the art, such as the metal naphthenates, including cobalt naphthenate, can be employed, if desired.

The reaction time alone is not a critical aspect of the process for the production of the viscosity index improvers of the invention, the condensation process being continued for a time period requisite to produce a product having the previously defined characteristics. In some types of equipment, the process is completed in about 5 to 15 hours. In other types of equipment, and with variations in starting materials, 10 days or more may be required. The required reaction time is a function of the temperature at which the condensation process is affected, the rate of supply of free gaseous oxygen to the reaction mixture, and the rate at which the heat of reaction is dissipated.

The hydrocarbon starting materials which are employed in the production of the viscosity index improving agents of the invention must be characterized by an average ebullioscopic molecular weight of at least about 500, preferably at least about 1000. An optimum average ebullioscopic molecular weight range is from about 1200 to 1700.

The most appropriate starting materials for the production of the viscosity index improving agents contemplated by the invention take the form of suitable fractions of crude oils. Appropriate fractions derived from crude oils of any source, including Pennsylvania crude oils, Mid-Continent crude oils, West Coast crude oils, Canadian crude oils, and the like, can be employed. All types of crude oils, including paraffin base crude oils, asphalt base crude oils, and naphthenic crude oils provide suitable sources from which petroleum fractions useful in the production of the viscosity index improving agents of the invention can be derived.

While the invention contemplates the production of viscosity index improving agents from pure or substantially pure individual hydrocarbons, such materials do not constitute optimum starting materials. It will be appreciated, however, that such pure hydrocarbons of appropriate molecular weight can be suitably employed.

With respect particularly to fractions derived from Pennsylvania crude oils, it is preferred that the hydrocarbon starting materials from which the viscosity index improving agents of this invention are produced be characterized by a bromine number not in excess of 10.

It is additionally preferred that hydrocarbons which are utilized as starting materials for the production of the viscosity index improving agents of the invention contain more than about 2 naphthenic rings per molecule, which rings can be individually integrated with the paraffinic chain portion of the hydrocarbon molecules or condensed with aromatic rings and/or with other naphthenic ring systems. It is also preferred that the hydrocarbon starting materials contain an average of not more than about 50% aromatic carbons per molecule. Hydrocarbons which contain an appreciable quantity of highly condensed ring systems, such as those hydrocarbons which are found in the phenol or furfural extracts of lubricating oils, are operable and are most appropriately employed as starting materials for the production of viscosity index improving agents for synthetic lubricating oil compositions such as the diester oils.

Additionally, it is preferred that the petroleum fractions from which the viscosity index improving agents of the invention are produced contain not more than about 10% of wax type materials. The wax content herein referred to is determinable by a procedure similar to that described under A.S.T.M. designation D-721-51T with the exception that methyl isobutyl ketone is employed to precipitate the wax, the sample size is reduced to 0.5 gram, and the determination is conducted at 0° F. While the starting materials which contain substantially more than 10% by weight of wax, as determined by this test, e.g., petroleum which may reflect a wax content on the order of 40% by weight, can be employed in the production of the viscosity index improving agents of the invention, such materials are not preferred. Such materials can be best used by blending with more desirable starting materials, such as the preferred petroleum fractions above described, in proportions up to about 25% by weight of the total blend.

Normal or vacuum distillation residual stocks and analogous fractions of paraffin base crude oils, such as Pennsylvania crude oils, are highly appropriate starting materials for the production of the viscosity index improving agents employed in this invention. Hydrocarbons precipitated by conventional propane precipitation processes from such residual stocks are particularly suitable.

Further refinement of such propane precipitated, high molecular weight hydrocarbons, which include both light and heavy resin fractions, by extraction with furfural or phenol in conventional manner, yields a raffinate from which viscosity index improving agents of maximum effectiveness are produced. Conventional solvent extraction processes are utilized to obtain such raffinates. Such processes are well known to the prior art and are described in detail, inter alia, in Industrial and Engineering Chemistry, 40, pages 220-227 (1948), and at pages 335-336 of "Chemical Refining of Petroleum" by V. A. Kalichevsky and B. A. Stagner, Reinhold Publishing Co., 1942. Generally, the degree of extraction should be such as to yield about a 70% to 85% raffinate. More drastic extraction, for example, to yield 50% to 60% raffinates, may be practiced to obtain still more desirable starting materials for the production of the viscosity index improving agents of the invention.

The most preferred starting material for the production of the viscosity index improving agents of this invention embraces a solvent extracted Pennsylvania crude oil fraction having a molecular weight of from about 1200 to about 1700, a bromine number of not more than about 4, which is substantially wax and asphalt free, which contains not more than about 5% by weight of hydrocarbon molecules containing more than 5 aromatic rings, and which consists primarily of hydrocarbon molecules containing an average of from about 2 to about 7 naphthenic rings.

In some environments, it may be desired to protect the viscosity index improving agents of this invention against oxidation. In accordance with one feature of this invention, such protection is effected through chemical modification of the hydrocarbonaceous condensation products, heretofore described, to produce non-equivalent materials. More specifically, the oxidation resistance of such condensation products is increased by further chemical treatment to neutralize reactive groups and/or simultaneously build antioxidant properties into the molecular structure. Appropriate inorganic reagents for this purpose include $P_2S_5$ and elemental sulfur, which function to incorporate phosphorus, sulfur, or a combination thereof, in the condensation products. Further, partial reaction of such condensation products with sulfur followed by reaction with aromatic amines and diamines, such as diphenylamine, o-phenylenediamine, β-naphthylphenylamine, and the like, has been shown to reduce oxidation susceptibility of the viscosity index improving agents of this invention.

Also, ammonia and polyalkylene polyamines derived from ethylene diamine, such as diethylene triamine, triethylene tetramine, tetraethylene pentamine, and the like, or mixtures thereof, are also suitable modification agents for the otherwise unmodified hydrocarbonaceous condensation products of the invention.

Additionally, the various isocyanates which respond to the following formula:

(I) 

in which R is an alkyl group containing from 1 to 10 carbon atoms, and $n$ is any integer from 1 to 3 inclusive, can be employed to modify the oxygen condensation products of the invention. Typical alkyl groups which are represented by R include methyl, ethyl, propyl, isopropyl, butyl, isobutyl, hexyl, octyl, decyl, and the like. R may also be aryl, including tolyl, phenyl, diphenyl methane, alpha-naphthyl, and the like, in the foregoing isocyanate formulae.

As illustrated in the ensuing examples, the aforementioned inorganic and organic reagents are utilized, alone or in combination, by heating a mixture of the condensation product and the selected reagent or reagents at an appropriate temperature for a short period of time. In general, at least about 0.25% by weight, preferably about 0.25% to about 5.0% by weight of the organic or inorganic reagents, or mixtures thereof, are employed, based on the weight of the condensation product. Such quantities generally afford an excess of the reagent, which is not objectionable. The time and temperature of the reaction is not critical, the chemical routineer having requisite skill to carry out the process. In general, a temperature of from about 175° F. to about 500° F. and a reaction time of at least about 20 minutes, preferably from about 20 to 120 minutes, can be observed with satisfactory results. In the case of certain of the organic reagents, temperatures must be controlled to prevent decomposition. A preferred procedure is to convert by blowing the hydrocarbon fraction to a condensation product having a ring and ball softening point somewhat below, for example, 10 to 20° below the softening point desired in the final product, followed by reaction with the above described reagents to an extent requisite to raise the ring and ball softening point to the ultimately desired value.

Inasmuch as many condensation products are readily workable only at relatively high temperatures, i.e., 350 to 450° F., an alternative method for modifying such products is advantageously employed when reagents are utilized which may be unstable at such high temperatures. Such alternative procedure embraces first blending the condensation product which is to be modified with the base stock in which it is to be ultimately utilized in appropriate proportions followed by the addition of a suitable quantity of reagent. More specifically, the condensation products may be mixed in proportions from about 20% to 50% by weight with the ultimate base stock in which they are to be utilized.

To the mixture so obtained, there is then added from about 1 to about 5% by weight of the desired reagents, based upon the condensation product, preferably in small proportions, under an atmosphere of nitrogen. The desired reaction is then effected at a temperature of from about 175° F. to 275° F. The ultimate product so obtained is then admixed in appropriate concentration with additional quantities of the base stock employed. This procedure is particularly applicable in the modification of the condensation product useful as a viscosity index improver through utilization of such reagents as $P_2S_5$ and the isocyanates, as above defined.

Alternatively, the viscosity index improving agents of this invention and fluids containing such agents, may be inhibited against oxidation by incorporation thereinto of various antioxidant materials, including those known to the prior art.

It has been discovered that the compositions of this invention consitute an excellent medium for blending with lubricating oils, various antioxidant and other materials which are insoluble in oils alone and which, therefore, have heretofore been considered unsuitable for use in lubricating oil compositions. Typical of such antioxidants is phenothiazine, and the substituted phenothiazines responding to the following formula:

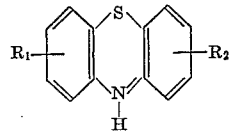

$R_1$ and $R_2$ are hydrogen or alkyl groups containing not more than 10 carbon atoms including, by way of example, those various specific alkyl groups specified with respect to Formula I. There can be from 0 to 4 such R substituents in each aromatic nucleus.

Pursuant to this aspect of the invention, the condensation products formed by contacting the hydrocarbon starting materials with a free oxygen-containing gas are first heated to above the softening point and the phenothiazine or other antioxidant or material to be incorporated is then blended therewith. The blend so formed is thereafter dissolved or dispersed in a lubricating oil, power transmission fluid, or the like, in conventional manner. Antioxidants, other than phenothiazines, which can be similarly employed, include ascorbic acid, low molecular weight dithiophosphate esters, such as the zinc dithiophosphates of which the zinc salt of ethyl dithiophosphoric acid is representative, aromatic amines, such as $\beta$-naphthylphenylamine, di-$\beta$-naphthyl amine, and the like.

Also, there may be blended with the oils, power transmission fluids, and the like, containing the viscosity index improving and pour point depressing agents of this invention, antioxidants known to be useful in lubricating oil. Typical of such antioxidants are the various phenates, dithiophosphates, amines, phenols, dithiocarbamates, phosphites, and the like. It is the intent of this disclosure to embrace such antioxidants generically. Since these materials are well known to the art, they will not be further enumerated here.

Additional materials which can be incorporated into lubricating compositions through the medium of the viscosity index improving agents of this invention include alkaline earth carbonates, such as those of barium and calcium, the various alkaline earth oxides and hydroxides, boric acid, boric acid esters, and the like.

It will be appreciated that the condensation products disclosed as being useful as viscosity index improving agents in this invention can be employed in fuel oil materials to prevent the precipitation of solids therefrom as a result of the capability of such condensation products to suspend finely divided solids. A typical example is a blend of virgin distillate gas oil and catalytically cracked fuel oil with 0.1% by weight of the viscosity index improving agent of Example I of this specification.

The viscosity index improving agents contemplated by this invention can be operably employed in wide and effective proportions in all types of mineral oils, greases, power transmission fluids, shock absorber fluids, and like materials, which are characterized by a boiling point in excess of 400° F. Specifically with respect to lubricating oils and greases, the viscosity index improving agents of the invention are appropriately utilized in a concentration of at least about 1.0% by weight, preferably from about 3.0% to about 15.0% by weight.

The invention contemplates the use of the viscosity index improving agents in all proportions effective to improve the viscosity of all oleaginous compositions having a boiling point in excess of 400° F. and a flash point in excess of 200° F. including base oils, greases, power transmission fluids, shock absorber fluids, and the like, in which they are incorporated. The viscosity index improving agents can be employed in oils, greases, and power transmission fluids derived from Pennsylvania crude oil, Mid-Continent crude oils, asphalt base oils, and all other types of mineral oils, as well as synthetic oils, including particularly the synthetic ester type oils, such as di-2-hexylethyl sebacate and di-2-ethylhexyl adipate, and phosphonate oils, such as dibutyl diphosphonate, tetrabutyl tetramethylene diphosphonate, and bis (2-ethylhexyl) 2 ethylhexyl phosphonate. The invention contemplates such oleaginous materials generically.

EXAMPLE I

Separation from cylinder stock of viscous hydrocarbons for use in the preparation of viscosity index improving agents About 75,000 grams of a cylinder stock derived by distillation from paraffin base Pennsylvania crude oil and characterized by a boiling point in excess of about 850° F., a molecular weight of about 750, a viscosity at 210° F. of 225 SUS, an A.P.I. gravity of about 24.8, and a flash point (Cleveland Open Cup) of about 600° F. is mixed with propane, heated to a temperature of about 190° F. and then cooled to a temperature of about 65° F. The cylinder stock-propane solution is thereafter transferred into a chilling tank wherein the pressure is reduced to an extent requisite to volatilize sufficient propane to lower the temperature of the solution to about −20° F. to about −50° F. Makeup propane is added during the chilling operation, such that the ratio of propane to cylinder stock is about 3 to 1 at the end of the chilling cycle. During the chilling cycle, petrolatum is precipitated from the solution. The chilled cylinder stock-propane solution containing precipitated petrolatum is transferred to a filter feed tank and thence passed through an appropriate filter to effect removal of the petrolatum from the chilled solution.

Propane is added to the filtrate in an amount sufficient to raise the propane-cylinder stock ratio to about 10 to 1 and the temperature of the solution so obtained is elevated to about 150° F. to 180° F. whereupon about 15,000 grams of high molecular weight viscous materials are precipitated. These viscous materials still contain some propane.

The material so obtained is then mixed at a temperature of about 130° F. to 135° F. with additional propane to increase the propane-oil ratio to about 20 to 1. The temperature of the resulting solution is lowered to about 100° F. whereupon about 6,000 grams of viscous hydrocarbons are precipitated. These materials after removal of all residual propane are designated as heavy resins and are characterized by a molecular weight of about 1400, a viscosity of about 4100 SUS at 210° F., and a bromine number of 3.7.

The remaining oil-propane solution is heated to about 150° F. whereupon 9,000 grams of additional viscous hydrocarbons which are designated as light resins are precipitated. Any residual propane is removed in a flash chamber. These hydrocarbons are characterized by a molecular weight of about 1300, a viscosity of about 1150 SUS at 210° F., and a bromine number of about 4.0.

Preparation of viscosity index improving agent

About 9000 grams of the viscous materials separated from the cylinder stock, in the manner above described and designated as light resin, and 1000 grams of bright stock are charged to suitable apparatus for air blowing and initially heated to a temperature of 500° F. Air is passed through the mixture at a rate of about 60 cu. ft./gal./hr. as the temperature was raised. The air blowing is continued at about the same rate for approximately 8 hours during which time the reaction mixture is maintained at a temperature of approximately 500° F. to produce a final product characterized by a ring and ball softening point of about 250° F. The bright stock referred to is a fraction of Pennsylvania paraffin base crude oil having a boiling point range greater than about 850° F., a viscosity of about 150 SUS at 210° F. and obtained by solvent dewaxing and deresining of cylinder stock.

Lubricating oil compositions containing the viscosity index improver as produced in the manner above described The viscosity index improver produced by the blowing process above described is blended with a neutral oil having a viscosity of about 60 SUS at 100° F. derived from Pennsylvania paraffin base crude oil by redistillation of a wide boiling primary distillate which has undergone chilling to remove wax, in the concentrations and with the results indicated in Table 1.

TABLE 1.—BLENDS OF VISCOSITY INDEX IMPROVER OF EXAMPLE I WITH 60 AT 100 NEUTRAL

| | Vis. at 100 | Vis. at 100 | V.I |
|---|---|---|---|
| Wt. Percent V.I. Improver: | | | |
| 0.0 | 60.7 | 35.1 | 88.7 |
| 2.5 | 66.3 | 36.2 | 114.6 |
| 5.0 | 79.8 | 38.6 | 148.6 |
| 7.0 | 115.2 | 44.7 | 167.1 |
| 10.0 | 119.8 | 45.3 | 165.6 |

The process described with reference to Table 1 is repeated with the exception that in this instance there is used a neutral oil having a viscosity of 60 SUS at 100° F. derived as a distillate from a naphthenic base crude. The results are reported in Table 2.

TABLE 2

| | Vis. at 100 | Vis. at 210 | V.I. |
|---|---|---|---|
| Wt. Percent V.I. Improver: | | | |
| 0.0 | 60.6 | 34.2 | 25.9 |
| 2.5 | 72.4 | 36.4 | 77.4 |
| 5.0 | 90.7 | 39.1 | 121.8 |
| 10.0 | 159.0 | 47.4 | 143.9 |

EXAMPLE II

4% by weight of the viscosity index improver described in Example I is dissolved in the commercial synthetic lubricating oil sold under the trade name "Plexol 201," which is essentially di-2-ethylhexylsebacate. The di-2-ethylhexylsebacate containing no viscosity index improver is characterized by a viscosity index of 154.5. The addition of 4% by weight of the viscosity index improving agents of this invention increases the viscosity index of the di-2-ethylhexylsebacate to 179.7.

Similarly 4% by weight of the viscosity index improver described in Example I is dissolved in a synthetic lubricating oil consisting of di-2-ethylhexyl-adipate. The di-2-ethylhexyl-adipate containing no viscosity index improver is characterized by a viscosity index of 119.3. The addition of 4% by weight of the viscosity index improving agent of Example I increased the viscosity index of the di-2-ethylhexyladipate to 183.6.

EXAMPLE III

It is the purpose of this example to demonstrate the the effectiveness of the viscosity index improving agents of this invention as pour point depressants. The viscosity index improving agent described in Example I is blended with a fraction of Pennsylvania paraffin base crude oil characterized by a viscosity of 60 SUS at 100° F. in the proportions and with the results indicated in Table 3.

TABLE 3

| Wt. percent V.I. improver | Pour point |
|---|---|
| 0.0 | −10 |
| 7.0 | −20 |
| 10.0 | −20 |

The procedure described with respect to Table 3 is repeated with the exception that in this instance there is employed a medium neutral raffinate, i.e., a solvent extracted neutral obtained from Pennsylvania paraffin base crude and having a viscosity of about 45 SUS at 210° F. and a boiling point range of about 740° F. to about 850°

F., in lieu of the 60 at 100 fraction employed in obtaining the data reported in Table 3.

The medium neutral raffinate employed is characterized by a pour point of +15° F. A blend of medium neutral raffinate with 5% by weight of the viscosity index improving agents of the invention is characterized by a pour point of −20° F., whereas a blend of medium neutral raffinate with about 7% by weight of the viscosity index improving agents of the invention is characterized by a pour point of −30° F.

The procedure described with reference to Table 3 is repeated with the exception that in this instance there is employed a Pennsylvania crude oil fraction having a boiling point range of about 508° to 556° F. The results obtained are reflected in Table 4.

TABLE 4

| | Vis. at 100 | Vis. at 210 | V.I. | Pour point |
|---|---|---|---|---|
| Wt. Percent V.I. Improver: | | | | |
| 0.0 | 37.0 | 30.2 | | +10 |
| 4.9 | 42.7 | 32.3 | | +5 |
| 7.0 | 46.0 | 33.4 | 167.3 | 0 |
| 10.0 | 53.5 | 35.6 | 187.8 | −40 |

EXAMPLE IV

A viscosity index improver is prepared in a manner identical to that described in Example I with the exception that the blowing process was terminated when the product was characterized by a ring and ball softening point of about 130° F. The material so formed was blended with a 60 at 100 neutral oil fraction, of the type described in Example I, in the concentrations and with the results in improvement in the viscosity index as reported in Table 5.

TABLE 5

| | Vis. at 100 | Vis. at 210 | V.I. |
|---|---|---|---|
| Wt. Percent V.I. Improver: | | | |
| 0.0 | 60.7 | 35.1 | 88.7 |
| 2.0 | 67.0 | 36.2 | 104.2 |
| 4.0 | 73.2 | 37.2 | 120.5 |
| 5.0 | 77.8 | 37.9 | 128.7 |
| 7.0 | 85.2 | 38.9 | 137.5 |
| 10.0 | 105.5 | 41.8 | 152.1 |

EXAMPLE V

The process of Example I is repeated but in this instance the blowing process was stopped at a point requisite to produce a product having a ring and ball softening point of about 160° F. The material so formed is blended with a 60 at 100 neutral oil fraction of the type described in Example I in the concentrations and with the results in improvement in the viscosity index as reported in Table 6.

TABLE 6

| | Vis. at 100 | Vis. at 210 | V.I |
|---|---|---|---|
| Wt. Percent V.I. Improver: | | | |
| 0.0 | 60.7 | 35.1 | 88.7 |
| 2.0 | 67.4 | 36.3 | 107.0 |
| 4.0 | 82.0 | 38.6 | 136.7 |
| 5.0 | 93.3 | 40.1 | 148.8 |
| 7.0 | 106.9 | 41.8 | 149.1 |
| 10.0 | 122.0 | 44.4 | 156.5 |

EXAMPLE VI

The viscosity index improver is prepared by the method described in Example I with the exception that in this instance the blowing process was stopped at a point requisite to provide a product characterized by a ring and ball softening point of about 190° F. The material so formed is blended with a 60 at 100 neutral oil fraction of the type described in Example I in the concentrations and with the results in improvement in the viscosity index as reported in Table 7.

TABLE 7

| | Vis. at 100 | Vis. at 210 | V.I. |
|---|---|---|---|
| Wt. Percent V.I. Improver: | | | |
| 0.0 | 60.7 | 35.1 | 88.7 |
| 2.0 | 67.8 | 36.3 | 105.7 |
| 4.0 | 75.2 | 37.5 | 125.1 |
| 5.0 | 80.4 | 38.4 | 137.4 |
| 7.0 | 88.7 | 39.6 | 148.8 |
| 8.0 | 99.4 | 41.4 | 159.3 |

EXAMPLE VII

The process of Example I is repeated with the exception that in this instance the blowing process was stopped at a point requisite to produce a product having a ring and ball softening point of about 220° F. The material so formed is blended with a 60 at 100 neutral oil fraction of the type described in Example I in the concentrations and with the results in improvement in the viscosity index as reported in Table 8.

TABLE 8

| | Vis. at 150 | Vis. at 210 | V.I |
|---|---|---|---|
| Wt. Percent V.I. Improver: | | | |
| 0.0 | 60.7 | 35.1 | 88.7 |
| 2.0 | 69.0 | 36.6 | 115.0 |
| 4.0 | 79.0 | 38.3 | 138.8 |
| 7.0 | 103.0 | 42.3 | 164.3 |

EXAMPLE VIII

The process of Example I is repeated with the exception that in this instance the blowing process is stopped at a point requisite to produce a product having a ring and ball softening point of about 270° F. The material so formed is blended with a 60 at 100 neutral oil fraction, of the type described in Example I, in the concentrations and with the results in improvement in the viscosity index as reported in Table 9.

TABLE 9

| | Vis. at 100 | Vis at 210 | V.I |
|---|---|---|---|
| Wt. Percent V.I. Improver: | | | |
| 0.0 | 60.7 | 35.1 | 88.7 |
| 2.0 | 70.0 | 36.8 | 119.6 |
| 4.0 | 80.7 | 38.7 | 147.4 |
| 5.0 | 89.5 | 40.1 | 159.9 |
| 7.0 | 106.5 | 42.7 | 162.7 |

EXAMPLE IX (A) The process of Example VII is repeated to produce a viscosity index improving agent having a ring and ball softening point of 220° F. The product so obtained is then admixed with sufficient $P_2S_5$ under an atmosphere of nitrogen and heated for a period of about 2 hours at a temperature of about 500° F. to produce an ultimate product characterized by a ring and ball softening point of about 250° F.

A blend of dewaxed paraffin base oil fraction derived from Pennsylvania crude oil and characterized by a viscosity of 100° F. at about 60 SUS is blended with 10% by weight of the product formed in the manner above described.

The viscosity index of the original oil fraction was about 88.7 and the viscosity index of the blend was 154.2. The viscosity of the blend at 100° F. was 139.3 and at 210° F. was 46.5.

(B) The procedure above described is repeated with the viscosity index improving agent prepared by the method of Example I, with the exception that the blowing process was stopped at the time the condensation product is characterized by a ring and ball softening point of about 237° F. Three parts by weight of distilled $P_2S_5$ is introduced into the condensation product while at a temperature of about 240° F. These reactants were mixed at this temperature for about 120 minutes to obtain an ultimate product having a ring and ball softening point of about 249° F. The viscosity index improver so obtained is similar in effectiveness to the product of Example IX–A.

(C) As an alternative procedure designed to prevent decomposition of the phosphorus products, a condensation product is produced by the method of Example I, with the exception that the blowing process is terminated to produce a product having a ring and ball softening point of about 230° F. About 33 parts by weight of the material so obtained are blended with about 67 parts by weight of a mixture containing 25% by volume of a neutral oil fraction separated from Pennsylvania crude oil and having a viscosity of 70 SUS at 100° F. and about 75% by volume of light neutral raffinate obtained by phenol extraction of a neutral derived from Pennsylvania crude oil and having a viscosity of 89 SUS at 100° F. To the mixture so obtained, there is added 1% by weight of $P_2S_5$ in small proportions with nitrogen agitation. The temperature of the mixture so obtained is raised to about 225–250° F. and maintained within that range for a period of approximately 2 hours. The product is diluted to a concentration of 25% by the addition of the same mixture of 70 at 100 neutral and light neutral raffinate, as above described. This blend contained about 0.54% sulfur and 0.20% phosphorus. When diluted further to a concentration of about 10%, this product demonstrated similar effectiveness as a viscosity index improver as the product described under Example IX–A.

EXAMPLE X

The process as described in Example IX was repeated with the exception that in this instance about 0.5% by weight of flowers of sulfur is used in lieu of $P_2S_5$. In this example the sulfur is added at the time the ring and ball softening point of the blown product was about 230. When blended in the same proportion and with the same oil as the viscosity index improver of Example IX–A, there was obtained a composition having a viscosity of 100° F. of 148.5 at 210° F. of 48.2, and a viscosity index of 157.6.

EXAMPLE XI

A viscosity index improving agent is prepared in the manner described in Example I with the exception that the blowing is terminated at a point requisite to produce a material characterized by a ring and ball softening point of about 217° F. The temperature of the product is lowered in the final stages of the blowing process from about 500° F. to about 400° F. and the blowing discontinued. 50 grams of flowers of sulfur is then added and the mixture agitated with nitrogen while maintained at a temperature of 400° F. for a period of about 2 hours to obtain a final product having a ring and ball softening point of about 277° F. and a sulfur content of about .13% by weight. This product when blended in the proportion of about 7% by weight raised the viscosity index of the 60 SUS at 100° F. neutral fraction described in Example I from about 88.7 to about 161.0.

EXAMPLE XII

This example is illustrative of a grease composition containing a viscosity index improving agent of the type contemplated by the invention. Approximately 88 parts of prime tallow and 85 parts of hydrated barium hydroxide, $Ba(OH)_2 3H_2O$, are mixed at room temperature in a suitable steam jacketed kettle, following which the temperature is raised to above the boiling point of water to remove water of crystallization of the hydrated barium hydroxide and to form the barium soaps. In order to solubilize the barium soaps, there is added a suitable quantity of a naphthenic base stock having a viscosity of about 533 SUS at 100° F., 57 SUS at 210° F. and a viscosity index of about 46. During this addition the temperature is raised to about 350° F. to initiate gelation. Completion of the grease manufacture is effected by adding an oil mixture consisting of 10% by weight of the viscosity index improving agent described hereinbefore in Example I and 90% by weight of the 60/100 neutral fraction derived from Pennsylvania paraffinic base crude oil described in Example I, the total mixture having a viscosity of 47.6 SUS at 210° F., 149.4 SUS at 100° F., and a viscosity index of 153.3.

The resulting grease contains approximately 25% by weight of barium soap, about 15% by weight of the naphthenic neutral fraction described above, and about 60% by weight of the high viscosity index oil mixture referred to above, and is characterized by the following properties:

| | |
|---|---|
| Worked penetration (ASTM D217–52T) | 270 |
| Moisture content (ASTM D128–47) _____percent__ | 0.1 |
| Dropping point (ASTM D566–42) _____° F__ | 499 |

In addition, the grease had good shear stability and possesses excellent pumpability properties even at low extremes of temperature.

EXAMPLE XIII

A shock absorber fluid was compounded of the following ingredients:

| | Percent by weight |
|---|---|
| Overhead distillate from Pennsylvania base kerosene, viscosity 39 SUS at 100° F., flash point 215° F., boiling point range 404° F., to 500° F. | 34.4 |
| Fuel oil—overhead distillate from coastal crude, viscosity 31.1 SUS at 100° F., flash point 230° F., boiling point range 440° F. to 500° F. | 51.6 |
| Viscosity index improver of Example I | 13.5 |
| Tricresyl phosphate | 0.5 |

The shock absorber fluid so prepared was attended by the following properties:

| | |
|---|---|
| Viscosity index | 197.1 |
| Viscosity at 100° F. | 85.7 |
| Viscosity at 210° F. | 42.2 |
| Flash point _____° F__ | 200 |
| Pour point _____° F__ | —50 |

EXAMPLE XIV 4.0% by weight of the viscosity index improver described in Example I was blended with 96% by weight of a synthetic lubricant consisting of bis-(2-ethylhexyl)-2-ethylhexyl phosphonate. The synthetic lubricant bis-(2-ethylhexyl)-2-ethylhexyl phosphonate was characterized by a viscosity index of 79.0. The blend of the synthetic lubricant and the viscosity index improver of Example I was characterized by a viscosity index of 109.4.

EXAMPLE XV

A viscosity index improving agent is prepared in the manner described in Example I with the exception that the blowing process is terminated at a point requisite to provide a condensation product having a ring and ball softening point of 180°–200° F. 311.8 grams of the condensation product so obtained are heated to a temperature of about 400° F. and 0.78 gram of tolylene diisocyanate is added. The temperature of the mixture is maintained at 400° F. with agitation for about 20 minutes, during which time the reaction mixture thickened. The product so obtained is characterized by a ring and ball softening point of about 245° F. This material, when blended in the proportion of about 10% by weight with the 60 SUS at 100° F. neutral oil, described in Example IV, raised the viscosity index of the oil from about 88.7 to about 163.0.

EXAMPLE XVI

A viscosity index improver is prepared in the manner described in Example I with the exception that the cylinder stock described in that example is used per se as the starting material from which the viscosity index improver is derived.

The viscosity index improver so obtained is similar in effectiveness to that described in Example I.

EXAMPLE XVII

A viscosity index improving agent is prepared from a fraction of Pennsylvania paraffin base crude oil designated as heavy resin described in Example I, which has been further processed by solvent extracting with phenol to a 65% raffinate yield.

The material above described is characterized by an average molecular weight of about 1680, a viscosity of about 1550 SUS at 210° F., a bromine number of 1.2, and is substantially wax and asphalt free. This material is heated to a temperature of about 475° F. and air is passed therethrough while the reaction mixture is maintained within a temperature range of 450°–500° F. for a time requisite to produce a product having a ring and ball softening point of about 245° F.

The effectiveness of the composition so obtained as a viscosity index improver in the Pennsylvania oil fraction having a viscosity of 60 SUS at 100° F., of the type previously described, is reflected in Table 10.

TABLE 10

| | Vis. at 100 | Vis. at 210 | V.I. |
|---|---|---|---|
| Wt. Percent V.I. Improver: | | | |
| 0.0 | 60.7 | 35.1 | 88.7 |
| 1.8 | 71.8 | 37.2 | 128.6 |
| 4.0 | 87.0 | 39.8 | 162.5 |
| 5.0 | 96.3 | 41.7 | 170.7 |
| 10.0 | 174.8 | 53.2 | 159.9 |

The viscosity index of a neutral derived from a naphthenic base crude and characterized by a viscosity of 60.6 SUS at 100° F. and 34.2 SUS at 210° F. is raised from 25.9 to about 149.1 by the addition of 10% by weight of the composition of this example.

EXAMPLE XVIII

The process of Example XVII is repeated with the exception that in this instance there is employed in lieu of the starting material described in Example XVII a bright stock raffinate produced as follows and having the following properties: the bright stock referred to in Example I is extracted with phenol to a 92% raffinate yield and is characterized by a viscosity of about 140 SUS at 210° F., a bromine number of 7.1, and a molecular weight of about 690.

The effectiveness of this material as a viscosity index improving agent is reflected by Table 11.

TABLE 11

| | Vis. at 100 | Vis. at 210 | V.I. |
|---|---|---|---|
| Wt. Percent V.I. Improver: | | | |
| 5.0 | 88.4 | 79.1 | 144.5 |
| 10.0 | 44.1 | 119.3 | 157.3 |

EXAMPLE XIX

The process of Example XVII is repeated with the exception that in this instance petrolatum resin is employed as a starting material from which the viscosity index improving agent is formed. The petrolatum resin is obtained by treating the petrolatum described in Example I with propane so that the propane oil ratio is approximately 10:1 and heating the resulting mixture to about 135–160° F. Petrolatum resin which is thereby precipitated from the solution is characterized by a viscosity of about 2800 SUS at 210° F., a gravity of about 18.6° API, and a wax content of about 40%.

The effectiveness of the condensation product produced by blowing petrolatum resin when employed as a viscosity index improver in the 60 at 100 neutral described in Example I is reflected by Table 12.

TABLE 12

| | Vis. at 150 | Vis at 210 | V.I. |
|---|---|---|---|
| Wt. Percent V.I. Improver: | | | |
| 0.0 | 60.7 | 35.1 | 88.7 |
| 5.0 | 79.7 | 38.3 | 135.5 |
| 10.0 | 109.0 | 42.3 | 152.9 |
| 15.0 | 165.6 | 48.9 | 149.4 |
| 20.0 | 275.7 | 60.7 | 143.9 |

EXAMPLE XX

About 83.8 parts by weight of the viscosity index improving agent produced in the manner described in Example I was heated to a temperature of about 300° F. and about 16.2 parts by weight of phenothiazine having the following formula was incorporated into the viscosity index improving agent by a colloid mill:

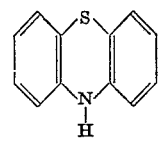

The product so obtained was cooled and when blended with a base oil demonstrated marked resistance to oxidation as reflected by the results of a Cub Engine KRC-17 test.

In conducting the Cub Engine KRC-17 test, there were employed two aliquot portions of an oil containing about 94 parts by volume of a medium neutral 95% raffinate such as described in Example III, and about 0.3 part by volume of a commercial antioxidant whose essential active ingredient is a zinc alkyl dithiophosphate in which the alkyl portion of the compound contains six to ten carbon atoms. To one aliquot portion of the above described blend, there was added about 6.8 parts by volume of the phenothiazine containing product of this example, whereas, to the other aliquot portion of the above described blend, there was added about 6.4 parts by volume of the product of Example I. With respect to the portion containing the phenothiazine product of this example, the Cub Engine KRC-17 test reflected a bearing weight loss of .042 mg., yielded a used oil containing about 2.9% by weight of pentane insolubles, and about 2% by weight of benzene insolubles. The portion containing 6.4 parts by volume of the product of Example I in an identical test resulted in a bearing weight loss of 0.089 mg. and a used oil containing about 5% by weight of pentane insolubles and about 4.8% by weight of benzene insolubles.

EXAMPLE XXI

The process of Example I is repeated with the exception that in this instance the reaction mixture is maintained at a temperature of 425° F. during the blowing operation. A product having a ring and ball softening point of about 250° F., similar to that of the product of Example I, is obtained after about 15 hours. The product was analogous in other respects to the product of Example I.

EXAMPLE XXII

The process of Example I is repeated with the exception that in this instance the reaction mixture is maintained at a temperature of 575° F. during the blowing operation. A product having a ring and ball softening point of about 250° F., similar to that of the product of Example I, is obtained after about 5 hours. The product was analogous in other respects to the product of Example I.

EXAMPLE XXIII

The viscosity index improving agents are prepared by the process of Example I with the variations of starting materials and ring and ball softening points in the final condensation products as indicated in Table 13. The effectiveness of these viscosity index improving agents when blended in the proportions indicated with the neutral oil having a viscosity of about 60 SUS at 100° F., described in Example I, is reflected by the data which appears in Table 13.

TABLE 13

| Air Blown Materials | Ring and Ball Softening Point of V.I.I., °F. | Percent V.I.I. in Blend | SUS at 100 | SUS at 210 | V.I. |
|---|---|---|---|---|---|
| Bright Stock, 83.5% Raffinate a (zero pour) | 242 | 3 | 69.6 | 36.9 | 128.5 |
| | | 5 | 81.2 | 38.8 | 150.1 |
| | | 6 | 86.4 | 39.7 | 163.0 |
| | | 7 | 96.2 | 41.3 | 165.1 |
| | | 10 | 125.3 | 45.3 | 159.6 |
| | | 15 | 233.4 | 57.8 | 149.5 |
| Solvent Extracted Mixed Base Bright Stock b | 241 | 3 | 69.1 | 37.0 | 135.0 |
| | | 5 | 80.1 | 39.1 | 165.8 |
| | | 6 | 88.9 | 40.3 | 166.2 |
| | | 7 | 111.6 | 43.9 | 165.7 |
| | | 10 | 135.9 | 46.9 | 159.9 |
| | | 15 | 276.7 | 61.7 | 145.7 |
| Light Resin, 58% Raffinate c | 188 | 1 | 65.2 | 36.2 | 119.5 |
| | | 2 | 76.5 | 38.3 | 152.5 |
| | | 4 | 102.5 | 43.0 | 172.2 |
| | | 5 | 122.7 | 46.3 | 168.4 |
| | 228 | 1 | 64.3 | 35.9 | 108.8 |
| | | 2 | 75.8 | 38.2 | 149.9 |
| | | 4 | 103.0 | 43.3 | 173.6 |
| | | 5 | 124.7 | 46.8 | 169.1 |
| | 270 | 4 | 102.3 | 43.3 | 174.8 |
| Heavy Resin, 65% Raffinate d | 205 | 4 | 79.8 | 38.3 | 155.7 |
| | | 7 | 108.2 | 43.2 | 164.9 |
| | 245 | 1.8 | 71.8 | 37.2 | 128.6 |
| | | 4 | 87.0 | 39.8 | 162.5 |
| | | 5 | 96.3 | 41.7 | 170.7 |
| | 255 | 2 | 68.9 | 36.9 | 129.2 |
| | | 4 | 86.3 | 40.2 | 172.0 |
| | 278 | 2 | 68.8 | 36.8 | 129.8 |
| | | 4 | 81.6 | 39.3 | 167.9 |
| | | 5 | 89.4 | 40.6 | 171.1 |
| Heavy Resin, 44% Raffinate e (Extraction 307) | 236 | 2 | 68.3 | 36.7 | 127.6 |
| | | 5 | 90.3 | 40.6 | 168.6 |
| | 281 | 2 | 65.9 | 36.3 | 120.2 |
| | | 6 | 86.6 | 40.0 | 166.6 |
| | 341 | 2 | 68.3 | 36.7 | 124.3 |
| | | 5 | 89.0 | 40.3 | 165.9 | a The bright stock, 83.5% raffinate (zero pour) is derived by propane dewaxing of Pennsylvania crude residual cylinder stock followed by phenol extraction to a 83.5% raffinate yield. This stock is characterized by a viscosity of 140 SUS at 210° F., a molecular weight of about 740, and a bromine number of about 7.0.

b Solvent extracted mixed base bright stock is prepared by solvent treatment of a Mid-continent base crude residuum and is characterized by a viscosity of 152.8 SUS at 210° F., a bromine number of 2.4, and a molecular weight of about 770.

c The light resin 58% raffinate is obtained by phenol extraction of the light resins described under Example I and is characterized by a molecular weight of about 1,490, a viscosity of 807.2 SUS at 210° F., and a bromine number of about 1.5.

d The heavy resin 65% raffinate is prepared by phenol extraction of the heavy resin described under Example I to a 65% raffinate yield and is characterized by a molecular weight of about 1,680, and bromine number of about 1.2, and a viscosity of about 1,575 SUS at 210° F.

e The heavy resin 44% raffinate is prepared by phenol extraction of the heavy resin described under Example I and is characterized by a molecular weight of about 1,570, a viscosity of about 1,645 SUS at 210° F., and a bromine number of about 1.5.

EXAMPLE XXIV

Lubricating oils are compounded including the viscosity index improving agent of Example I and the viscosity index improving agent of IX–C. In each instance, the base oil formulations contain about 70.03% by weight of a light neutral raffinate and 23.3% by weight of 70 at 100 neutral of the same type as described under Example IX–C.

To two aliquot portions of the base oil blend there is added 6.60% by weight of the viscosity index improving agent of Example I and 6.60% of the viscosity index improving agent first described in Example IX–C. To a third aliquot portion of this base oil blend there is added 4.50% by weight of a polyisobutylene fraction having a molecular weight of about 15,000 and 8.00% by weight of a solvent extracted neutral derived from Mid-Continent base crude and having a viscosity of about 160 SUS at 100° F. The compounded oils so obtained had equivalent viscosities at 210° F. and were subjected to Underwood oxidation tests with the following results after 20 hours test time.

TABLE 14

| | Product of— | | Polyisobutylene |
|---|---|---|---|
| | Ex. I | Ex. IX–C | |
| Bearing wt. loss, mgms | 22 | 3 | 65 |
| Sludge (naphtha insol.), mg./10 gms | 160 | 20 | 145 |

The Underwood oxidation test is carried out as described by H. C. Mougey in a preprint of World Automotive Engineering Congress, SAE, New York City (May 1939) with the exception that the test time is extended to about 20 to 25 hours.

EXAMPLE XXV

Auomatic transmission fluids were compounded from the products of Examples I, IX–A, X and XV, as follows:

TABLE 15.—COMPOUNDING DATA—AUTOMATIC TRANSMISSION FLUID FORMULATIONS

[In percent]

| | | | | | |
|---|---|---|---|---|---|
| Dewaxed 60/100 Neutral a | 41.43 | 57.51 | 57.51 | 57.51 | 53.30 |
| 500 at 100 Naphthenic Neutral b | 25.00 | 30.00 | 30.00 | 30.00 | 35.55 |
| Product of Ex. I | 6.82 | | | | |
| Product of Ex. IX–A | | 5.74 | | | |
| Product of Ex. X | | | 5.74 | | |
| Product of Ex. XV | | | | 5.74 | |
| Detergent-inhibitor-oiliness agent c | 6.65 | 6.65 | 6.65 | 6.65 | 6.65 |
| Pour point depressant d | 0.10 | 0.10 | 0.10 | 0.10 | |
| Commercial viscosity index improver e | | | | | 4.50 | a The dewaxed 60/100 neutral is the same type of neutral derived from Pennsylvania base crude described under Example I but which has been further dewaxed to a pour point of −35° F.

b The 500 at 100 naphthenic neutral is a straight distillate obtained from a naphthenic base crude and is characterized by a viscosity of 57.6 SUS at 210° F. and 530 SUS at 100° F. and a pour point of −30° F.

c A commercial product sold as Lubrizol LZ–282 containing an antifoam agent, a mild extreme pressure agent, and an antioxidant.

d The pour point depressant is an oil solution of a polymeric methacrylic ester having a viscosity of about 3,000 SUS at 210° F.

e The commercial viscosity index improver is an oil solution containing a polymeric methacrylic ester and having a viscosity of about 4,000 SUS at 210° F.

These materials were subjected to hte Underwood oxidation test with the results after 25 hours reflected in Table 16.

TABLE 16

| | Product of Example | | | | Commercial V.I. Improver |
|---|---|---|---|---|---|
| | I | IX–A | X | XV | |
| Bearing Weight Loss (mg.) | 48 | 47 | 40 | 35 | 25 |
| Percent Viscosity Increase at 210° F | +15 | +3 | +1 | +4 | +15 |
| Sludge, Naphtha Insolubles (mg./10 gm. Oil) | 2.0 | 2.5 | 2.1 | 2.4 | 198.3 |

EXAMPLE XXVI

There is compounded a hydromatic transmission fluid from the following ingredients:

61.1% by weight of double dewaxed 60 at 100 neutral of the type described in footnote a of Table 15
24.8% by weight 500 at 100 naphthenic neutral [a]
0.5% of zinc alkyl dithiophosphate (additive in which the alkyl groups are derived from aliphatic alcohols containing, 6 to 10 carbon atoms and sold as Lubrizol LZ–360)
6.65% of a commercial oil additive sold as Lubrizol LZ–282 and containing an antifoam agent, a mild extreme pressure agent, and an antioxidant
6.82% of the viscosity index improver of Example I
0.1% of the pour point depressant described in footnote d of Table 15

The results obtained from testing this fluid in the hydromatic transmission of a 1953 Oldsmobile are as follows:

| Date | 12-17-53 | 1-6-54 | 2-24-54 |
|---|---|---|---|
| Test Miles | 0 | 636 | 1,982 |
| Vis. at 100° F. SUS | 232.6 | 197.3 | 109.5 |
| Vis. at 210° F. SUS | 54.37 | 50.07 | 49.64 |
| V.I. | 139 | 135 | 132 |
| Neut. No.—pH | 8.5 | 7.7 | |
| TAN-E (ASTM D-664-52) | .96 | | |
| TBN-E (ASTM D-664-52) | 1.9 | 2.0 | |

EXAMPLE XXVII

Approximately 5670 grams of 90% light resin, as described in Example I, is blended with 10% bright stock raffinate, as described in footnote a of Table 13, and is airblown at a temperature of about 500° F. to a ring and ball softening point of about 200° F. This product is lowered to a temperature of 430° F. at which time about 383.5 grams of elemental sulfur are added. After a reaction time of about four hours, the ring and ball softening point of the product rises to about 290° F. and the product contains about 1.63% sulfur. To about 5200 grams of this product, there is added 244 grams of diphenylamine while the reaction mixture is held at a temperature of about 400–450° F. for two hours. There is produced in this manner a final product having a ring and ball softening point of 293° F.

About 7.5% by weight of this porduct is blended with 92.5% by weight of a 70/100 light neutral raffinate of the type described and the resulting oil is tested by the Underwood oxidation test procedure. The Underwood oxidation test results, after 20 hours test time, are as follows:

Bearing weight loss _____ 5.7 mg.
Sludge, naphtha insolubles _____ 16.3 mg./10 gm. oil
Viscosity increase _____ —5.0%.

EXAMPLE XXVIII 3860 grams of the same mixture of light resin and bright stock raffinate, as described in Example XXVII, are airblown at a temperature of about 500° F. to a ring and ball softening point of about 190° F. At this point, there is added 10% by weight of a mixture of polyalkylene polyamines consisting predominantly of diethylene triamine and triethylene tetramine. The temperature of the reaction mixture is maintained at 400° F. for a period of two hours, following which the product is stripped of volatile light ends by bubbling nitrogen vigorously therethrough. The product so produced is further blended with about 0.3% by weight of a zinc dithiophosphate of the type described in Example XXVI. This material was tested by the Cub Engine KRC-19 test procedure with the following results:

Piston color _____ 6.6
Bearing weight loss _____gram__ .05

[a] The 500 at 100 naphthenic neutral referred to is a straight distillate derived from a naphthenic base crude and is characterized by a viscosity of 57.6 SUS at 100° F. and 530 SUS at 210° F., and a pour point of —30° F.

Viscosity increase _____percent__ 140
Pentane insolubles _____by wt__ .79
Benzene insolubles _____by wt__ .66

EXAMPLE XXIX 400 grams of the viscosity index improver of Example I are mixed with 66.8 grams of β-naphthylphenylamine with agitation and at a temperature of about 450° F. When the amine is completely dispersed, there is added 4633.2 grams of a medium neutral raffinate, such as described in Example III, and 17.5 grams of a zinc dithiophosphate of the type described in Example XXVI. The resulting composition is tested by the Cub Engine KRC-19 test procedure with the following results:

Piston color _____ 6.0
Bearing weight loss _____gram__ .032
Viscosity increase _____percent__ 38
Benzene insolubles _____do____ 0.31
Pentane insolubles _____do____ 0.35

About 100 parts by weight of a heavy neutral raffinate is heated to a temperature of about 450° F. and air blown to a ring and ball softening point of about 250° F. The product so obtained is mixed in a concentration of about 4% by weight with the synthetic oil di-2-ethylhexyl adipate The viscosity index of the di-2-ethylhexyl adipate alone is 119.3. The viscosity index of the mixture of di-2-ethylhexyl adipate and the viscosity index improving agent of this example in a concentration of 4% by weight is 144.4.

The heavy neutral raffinate employed is a neutral oil product derived from Pennsylvania crude oil as an overhead distillate. The overhead distillate is dewaxed by propane and solvent refined with phenol to produce a final raffinate product characterized by hydrocarbons having an average ebullioscopic molecular weight of about 500.

EXAMPLE XXXI

Example XXX is repeated with the exception that in this instance di-2-ethylhexyl sebacate is employed as the base synthetic oil to which the viscosity index improving agent produced in the manner described in Example I is added. The viscosity index of the di-2-ethylhexyl sebacate alone is 154.5. The viscosity index of the mixture of di-2-ethylhexyl sebacate with 4% by weight of the viscosity index improver is 180.2.

EXAMPLE XXXII

About 100 parts by weight of a Pennsylvania bright stock extract which is a fraction of Pennsylvania crude oil removed from Pennsylvania bright stock by phenol extraction was employed as a starting material for the production of a viscosity index improver. This bright stock extract is characterized by the following physical characteristics:

Gravity, degrees _____API__ 10.4
Viscosity at 100° F_____SUS__ 840,000
Viscosity at 210° F_____SUS__ 1210
Viscosity index _____ 173

The bright stock extract is blown at a temperature of about 450° F. with air to produce a final product having a ring and ball softening point of about 250° F. Di-2-ethylhexyl sebacate, a synthetic oil characterized by a viscosity index of 154.5, was blended with 4% by weight of the blown bright stock extract product. The mixture so produced was characterized by a viscosity index of 167.6.

EXAMPLE XXXIII

The process of Example I is repeated with the exception that the blowing process is stopped at a point requisite to produce a product having a ring and ball softening point of about 120° F. The product so produced is then treated at a temperature of 500° F. with 1% by weight thereof of phosphorus pentasulfide added in four ¼% increments, one increment every fifteen minutes. The phosphorus pentasulfide modified product so produced is characterized by a ring and ball softening point of 184° F. This product is further treated at 500° F. with about 3⅜% by weight, based on the original blown product prior to treatment with phosphorus pentasulfide, of elemental sulfur added in small increments over a period of approximately five hours to produce a final product characterized by a ring and ball softening point of 242° F. and containing 0.19% by weight phosphorus and 1.34% by weight sulfur. This product when blended with a Pennsylvania 60 at 100 neutral in a concentration of 4% by weight gives a product having a viscosity at 100° F. of 69.8 SUS, a viscosity at 210° F. of 37.1 SUS, and a viscosity index of 136.7.

EXAMPLE XXXIV

1½ parts by weight of barium nonyl phenate containing 18.03% by weight of barium is blended with one part by weight of a medium neutral raffinate of the type described in Example III, together with one part of water for each 12½ parts of phenate to provide a more compatible mixture. The blend so produced is added in six increments to a mixture of one part by weight of the viscosity index improver described in Example I, and four parts by weight of the same medium neutral raffinate. The mixing is effected at a temperature of 220° C. Subsequent to the addition of each increment, the mixture is stirred for 30 minutes and blown with carbon dioxide for an additional 30 minutes, with the exception of the final increment, the addition of which is followed by a 30 minute stirring period and a 60 minute period of blowing wtih carbon dioxide.

The exhaust gas, which carries nonly phenol, is passed through a condenser in a benzene scrubber. 65.7% by weight of the nonly phenol is recovered.

The finally produced blend is centrifuged and filtered and contains 3.12% barium. This blend is diluted with the same medium neutral raffinate to a concentration of 8⅓% by weight thereof in said raffinate. At this dilution, the viscosity of the mixture at 100° F. is 394.5 SUS, the viscosity at 210° F. is 62.5 SUS, and the viscosity index is 108.4. A comparative mixture contaninig 10% by weight of the viscosity index improver of Example I and 90% by weight of the medium neutral raffinate is characterized by a viscosity at 100° F. of 413.0 SUS, a viscosity at 210° F. of 66.5 SUS, and a viscosity index of 125.8.

EXAMPLE XXXV

Approximately 1500 parts of tallow fatty acids (acid number of about 200 mg. KOH/gm.) and 750 parts of a naphthenic base neutral having a viscosity of 525 SUS at 100° F. were charged to a steam jacketed kettle equipped with a suitable agitator. There was then added about 1700 parts by weight of barium hydrate and 320 parts by weight of glacial acetic acid. The reactants were heated while maintaining good agitation to a temperature of from about 200° F. to about 240° F. to form a complex barium soap and to effect the requisite dehydration.

Grease formation was completed with the addition of about 6000 parts by weight of an oil containing air condensed light resins. This oil consisted of about 12 parts by weight of air condensed resins (the viscosity index improving agent prepared above, 250° F. ring and ball softening point) ½ part by weight phenyl-β-naphthylamine, and 87½ parts by weight of a 70 SUS at 100° F. neutral derived from Pennsylvania base crude oil and was characterized by the following properties:

| | | |
|---|---|---|
| Viscosity at 210° F. | SUS | 50.7 |
| Viscosity at 100° F. | SUS | 173.3 |
| Viscosity index | | 152.5 |
| Pour point | °F | −20 |

The grease was cooled and homogenized to insure a uniform structure. The resulting product was characterized by the following properties:

| | |
|---|---|
| Penetration at 77° F. (ASTM D 217–52T) | 275 |
| Dropping point, °F. (ASTM D 566–42) | 495 |
| Water content | Trace |
| Free fatty acid | Trace |

For the purposes of comparison, a barium grease was prepared in similar manner except that the only base oil employed was the 525 SUS at 100° F. napthenic neutral. The final grease was characterized by a penetration at 77° F. of 276 and a dropping point of 430° F.

EXAMPLE XXXVI

A lithium grease was prepared in the following manner: Approximately ¾ part by weight of lithium hydroxide were dissolved in 5 parts by weight of water by charging the reactants to an externally heated kettle equipped with a stirrer and maintained at a temperature of about 190–200° F. There was then added about five parts by weight of hydrogenated castor oil (saponification number 185 and hydroxyl number 155) and five parts by weight of a base oil of the following composition and physical properties:

| | | |
|---|---|---|
| Air condensed light resins (255° F. R&B) | percent | 20.0 |
| 70 at 100 neutral (Pennsylvania base) | do | 79.0 |
| Phenyl-β-naphthyl amine | do | 1.0 |
| SUS at 210° F. | | 80.1 |
| SUS at 100° F. | | 503.8 |
| V.I. | | 134 |
| Pour point | °F | −15 |

Reaction temperature was maintained at about 190° F. for about three to four hours to effect dehydration and complete soap formation. The temperature was then raised to about 280° F. for gellation to occur. After about five hours, the product was cooled and approximately an additional 11 parts by weight of the base oil described above were slowly added to complete the grease manufacture.

The resulting grease was characterized by the following properties:

| | | |
|---|---|---|
| Lithium soap | percent | 9.5 |
| Dropping point | | 365 |
| ASTM penetration at 77° F. | | 288 |
| Bleeding | | None |

For purposes of comparison, a lithium grease was prepared in an analogous manner except that the base oil employed was a solvent refined naphthenic neutral characterized by a viscosity at 210° F. of about 85 SUS and a viscosity index of 88. The resulting grease was characterized by the following properties:

| | | |
|---|---|---|
| Soap | percent | 8.5 |
| ASTM penetration at 77° F. | | 280 |
| Dropping point | °F | 380 |
| Bleed | | None |

EXAMPLE XXXVII

An aluminum grease was prepared in the following manner: Approximately 780 grams of preformed aluminum stearate and 12,220 grams of base oil containing 12½ parts by weight oxygen condensed light resin (248° F. ring and ball softening point prepared in the same manner as the viscosity index improving agent of Example I), ½ part by weight phenyl-β-naphthyl amine, and 87 parts by weight of 70 SUS at 100 neutral derived from Pennsylvania base crude oil were charged to a kettle equipped with a stirrer and external means for heating. The reactants were heated for approximately three hours at about 300° F. The grease so formed was allowed to cool over a period of about 12 hours and then homogenized in a mill.

The resulting product was characterized by the following properties:

| | | |
|---|---|---|
| ASTM penetration at 77° F. | | 320 |
| Dropping point | °F | 195 |
| Bleeding tendencies | | None |

A conventional aluminum stearate grease was similarly prepared, but employing with 5.1% by weight of the metallic soap approximately 94.9% of a solvent refined neutral derived from Pennsylvania base crude oil and characterized by a viscosity at 100° F. of 310 SUS, 102 viscosity index and −5° F. pour point. The resulting grease had the following properties:

ASTM penetration (77° F.) _____ 325
Dropping point _____ ° F__ 205
Bleed _____ None

EXAMPLE XXXVIII

A Bentone grease was prepared by employing as the gelling agent chemically modified Wyoming bentonite clays. A typical example is dimethyldioctadecyl ammonium bentonite. A grease was prepared from a gelling agent of this type by adding to a kettle and stirring at 250° F. eight parts of the Bentone clay described above and 94 parts by weight of an oil made up of 11.5% air condensed light resins (258° F. R & B) prepared in the same manner as the viscosity index improving agent of Example I, 0.5% phenyl-β-naphthyl amine, 88.0% 70 SUS at 100 neutral derived from Pennsylvania grade crude, and having a viscosity of 50.0 SUS at 210° F., a viscosity of 182.8 SUS at 100° F., a viscosity index of 145 and a pour point of −20° F. There was also added as a dispersing aid about 3% acetone. After all ingredients were thoroughly mixed, the reaction temperature was lowered to 175° F. About 0.1% by weight water was added and the sample passed through a colloid or paint mill with clearances between the rotor and stator maintained at about 0.001 inch. The rate of shear developed is sufficient to provide good dispersion of the gelling agent. The final grease was characterized by the following properties:

ASTM penetration at 77° F. _____ 293
Dropping point _____ None
Bleed _____ None

A similar grease prepared with conventional base oils was synthesized in a comparable fashion with 7% gelling agent. The base stock was a solvent refined bright stock derived from Pennsylvania base crude oil and having a viscosity at 210° F. of 143 SUS, a viscosity index of 102 and a +20° F. pour point. The resultant grease had an ASTM penetration at 77° F. of 291.

The physical performance characteristics of the greases prepared in the foregoing examples are tabulated in Tables I through IV hereinbelow:

TABLE I.—BARIUM GREASE PERFORMANCE DATA

| | Oxygen Condensed Resins | Conventional Base Oil |
|---|---|---|
| ASTM Penetration: | | |
| Unworked | 275 | 279 |
| 60 Strokes | 278 | 278 |
| 5,000 Strokes | 280 | 285 |
| 100,000 Strokes | 298 | 325 |
| Shell Roll Test:[1] Micropenetration Change at 16 hours, Percent | −2.4 | −16.7 |
| Dropping Point, ° F | 498 | 430 |
| Percent Soap | 25 | 22 |
| Free Fatty Acid, Percent | 0.2 | 0.1 |
| Wheel Bearing Test | Pass | |
| Pumpability at +20° F.,[2] lb./min | 0.40 | .10 |
| Apparent Viscosity at +10° F.,[3] poises | 210 | 1400 |
| Wheel Bearing Test[4] (Rating at 16 hours): | | |
| 0° F | Good | Poor |
| 75° F | Good | Poor |
| 180° F | Good | Fair |
| 220° F | Good | Fair |
| 275° F | Good | Poor |

[1] McFarlane, R. P., Institute Spokesman 6, No. 12, 1–5 (1943).
[2] NLGI Spokesman, 19, 10 [1955].
[3] ASTM D-1092-58T.
[4] Based on ASTM D-1263-53% except the apparatus is operated at 440 r.p.m. for 16 hours at the temperature indicated.

TABLE II.—LITHIUM GREASE PERFORMANCE DATA

| | Oxygen Condensed Resins | Conventional Base Oil |
|---|---|---|
| ASTM Penetration: | | |
| 60 Strokes | 274 | 288 |
| 5,000 Strokes | 278 | 290 |
| 10,000 Strokes | 280 | 293 |
| 100,000 Strokes | 297 | 305 |
| Shell Roll Test (Percent change Micropenetration): | | |
| 6 hours | Nil | 3.9 |
| 16 hours | 1.7 | 10.0 |
| Wheel Bearing Test (rating at 16 hours): | | |
| 0° F | Good | Good |
| 75° F | Good | Good |
| 180° F | Good | Good |
| 220° F | Good | Good |
| 270° F | Good | Good |
| 300° F | Good | Poor |
| Apparent Viscosity at +10° F., poises | 275 | 875 |

TABLE III.—SHEAR STABILITY—ALUMINUM SOAP GREASES

| | Oxygen Condensed Resins | Conventional Base Oil |
|---|---|---|
| Shell Roll Test (Percent change Micropenetration): | | |
| 6 hours | Nil | Too soft |
| 16 hours | 4.3% | |
| Pumpability at +20° F | 0.35 | |
| Apparent Viscosity at +10° F. (200 reciprocal seconds), poises | 200 | 900 |

TABLE IV.—PERFORMANCE OF BENTONE GREASES

| | Oxygen Condensed Resins | Conventional Base Oil |
|---|---|---|
| ASTM Penetration: | | |
| 60 Strokes | 293 | 270 |
| 5,000 Strokes | 290 | 326 |
| 10,000 Strokes | 290 | |
| 100,000 Strokes | 303 | 360 |
| Wheel Bearing Test (Rating at 16 hours): | | |
| 0° F | Fair | Good |
| 76° F | Good | Good |
| 180° F | Good | Poor |
| 220° F | Good | Poor |
| 270° F | Good | |
| 300° F | Poor | |

The KRC–17 engine test referred to in Example XX is a test procedure run in a Cub engine, which procedure is designed to coordinate with the CRC L–4 test. Specifically, the conditions observed in the KRC–17 test entained operation of the engine at 2500 r.p.m. at 11 brake horsepower for 40 hours, with an oil temperature 265° F. and a water jacket outlet temperature of 200° F.

The KRC–19 engine test referred to in Example XXVIII is analogous to the KRC–17 test with the exception that a jacket outlet temperature of 250° F. is maintained.

The condensation products which constitute the viscosity index improving agents of this invention are somewhat heterogeneous in character. It is postulated that such compositions, at least in substantial part, partake of a microgel structure which is responsible for the remarkable effectiveness of the compositions as viscosity index improving agents.

The term microgel denotes resins condensed to superpolymeric size, each superpolymer molecule being essentially a small particle of condensate of colloidal dimensions. The formation of microgel may occur in situ during reaction due to the heterogeneity of the oxygen condensing agent employed with the charge stocks (e.g., butadiene polymerization in emulsion produces microgels of size approximately that of the starting latex particles, W. V. Baker, Ind. & Eng. Chem. 41, 511–520, 1949) or due to subdivision of macrogels to submacrogels of microgel size through mechanical or thermal means, or due to some obscure means.

It is noted that initially both the intrinsic viscosity and the ring and ball softening point of the viscosity index improving agents of the invention increase with the time of the blowing or condensation reaction. However, after blowing or condensation time period, for example, of about five hours, the intrinsic viscosity values remain essentially constant for an additional time interval and then slightly decrease, whereas the ring and ball softening point values continue to progressively increase as the condensation proceeds. As previously found by Baker and others (Morton, Ind. & Eng. Chem. 47, 333) in studies of inherent viscosity (a measure of intrinsic viscosity) against percent conversion of diene emulsion polymerizations, the inherent viscosities tend to pass through a maximum when microgel formation occurs. While the percentage of conversion cannot be specified with respect to the viscosity index improving agents of the invention, it is evident that condensation proceeds throughout the duration of the reaction steadily inasmuch as the ring and ball softening point values progressively increase with reaction time.

The phenomenon of constant or maximal intrinsic viscosity values with time of reaction has been attributed in diene emulsion polymerization (Baker loc. cit.) to a change in molecular structure, i.e., formation of microgels. The microgels as with other gelations incorporates the longest chains, leaving a decreased weight average molecular weight component in the sol residue. The observations of the present work appear to be immediately analogous to the emulsion polymerization studies involving microgel formation reported above.

We claim:

1. An oleaginous composition having a boiling point in excess of 400° F. and a flash point in excess of 200° F., said composition containing a viscosity index improving amount of a hydrocarbonaceous condensation product having a combined oxygen content not in excess of about 5% by weight, said condensation product being produced by contacting a resinous hydrocarbon starting material derived from a mineral crude oil having a bromine number less than 10, not less than 2 naphthenic rings per molecule, not more than 50% aromatic carbon per molecule, not more than 10% wax hydrocarbon materials having an average ebullioscopic molecular weight in excess of about 500 while at a temperature of at least abort 400° F. with a free oxygen-containing gas for a time period requisite to produce a final product having a viscosity at least about 500 SUS at 210° F. greater than the hydrocarbon starting material and effective in a concentration of about 10% by weight to increase the viscosity index of a standard base mineral oil, derived from a paraffinic crude source, at least ten viscosity index units more than a like amount of the hydrocarbon starting material from which said condensation product is formed.

2. The composition of claim 1 wherein said hydrocarbon starting material is contacted with a free oxygen-containing gas while at a temperature of about 425° F. to about 575° F.

3. The composition of claim 1 wherein said condensation product is characterized by a ring and ball softening point of at least about 80° F.

4. The composition of claim 1 wherein said hydrocarbon starting material from which said condensation product is produced is characterized by a molecular weight from about 1200 to about 1700, a bromine number less than 4, from about 2 to 7 naphthenic rings per molecule and is substantially wax and asphalt free.

5. The composition of claim 1 wherein said resinous hydrocarbon starting material from which said condesation product is produced is a Pennsylvania crude oil fraction in which the hydrocarbons present have an average ebullioscopic molecular weight in excess of 1000.

6. The composition of claim 5 wherein said Pennsylvania crude oil fraction is a solvent extracted Pennsylvania crude oil fraction having a molecular weight of from about 1200 to about 1700, a bromine number of not more than about four, which is substantially wax and asphalt free, which contains not more than about 50% aromatic carbons per molecule, and which consists primarily of hydrocarbon molecules containing an average of from about two to about seven naphthenic rings.

7. The composition of claim 1 in which said condensation product is present in a concentration of at least about one percent by weight.

8. The composition of claim 1 in which said condensation product is present in a concentration of from about 1% to about 15% by weight.

9. The composition of claim 1 in which said oleaginous composition is a mineral oil of lubricating viscosity.

10. The composition of claim 1 wherein said oleaginous composition is a synthetic oil of lubricating viscosity.

11. The composition of claim 1 wherein said oleaginous composition is a grease.

12. An oleaginous composition having a boiling point in excess of 400° F. and a flash point in excess of 200° F., said composition containing a viscosity index improving amount of a hydrocarbonaceuos condensation product having a combined oxygen content not in excess of about 5% by weight, said condensation product being produced by contacting a resinous hydrocarbon starting material derived from a mineral crude oil having a bromine number less than 10, not less than 2 naphthenic rings per molecule, not more than 50% aromatic carbon per molecule, not more than 10% wax hydrocarbon materials having a molecular weight in excess of about 1000, while at a temperature of from about 400° F. to about 600° F., with a free oxygen-containing gas, and thereafter reacting the condensate so produced with a material selected from the group consisting of elemental sulfur and the phosphorus sulfides to produce a final reaction product having a viscosity at least about 500 SUS at 210° F. greater than the hydrocarbon starting material and effective in a concentration of about 10% by weight to increase the viscosity index of a standard base mineral oil, derived from a paraffinic crude source, at least ten viscosity index units more than a like amount of the hydrocarbon starting material from which said condensation product is formed.

13. A mineral oil fraction of lubricating viscosity having a boiling point in excess of about 400° F. and a flash point in excess of about 200° F. and containing a viscosity index improving amount of hydrocarbonaceous condensation product having a combined oxygen content not in excess of about 5% by weight, said condensation product being produced by contacting a resinous hydrocarbon starting material derived from a mineral crude oil having a bromine number less than 10, not less than 2 naphthenic rings per molecule, not more than 50% aromatic carbon per molecule, not more than 10% wax hydrocarbon materials having a molecular weight in excess of about 1000, while at a temperture of at least about 400° F., with a free oxygen-containing gas for a time period requisite to produce a final reaction product having a viscosity at least about 500 SUS at 210° F. greater than the hydrocarbon starting material and effective in a concentration of about 10% by weight to increase the viscosity index of a standard base mineral oil, derived from a paraffinic crude source, at least ten viscosity index units more than a like amount of the hydrocarbon starting material from which said condensation product is formed.

14. A grease composition containing a base oil having a boiling point in excess of 400° F. and a flash point in excess of 200° F., a viscosity index improving amount of a hydrocarbonaceous condensation product having a combinde oxygen content not in excess of about 5% by weight, said condensation product being produced by contacting a resinous petroleum hydrocarbon starting material substantially wax and asphalt free and which is produced by fractionation of heavy petroleum fractions with a liquefied normally gaseous hydrocarbon having an average ebullioscopic molecular weight of at least about 1000, a bromine number less than 10 and an SUS viscosity at 210° F. of at least 800 while at a temperature of about 400° F. to about 575° F. with a free oxygen containing gas for a time period requisite to produce a final product effective in a concentration of about 10% by weight to increase the viscosity index of a standard base mineral oil, derived from a paraffinic crude source, at least ten viscosity index units more than a like amount of the hydrocarbon starting material from which said condensation product is formed and a gelling agent.

15. A grease composition as claimed in claim 14 in which the gelling agent is selected from the group consisting of silica, bentonite, and soaps of barium, aluminum, lithium and sodium.

16. A grease composition as claimed in claim 14 containing about 5% to about 50% of a barium soap gelling agent produced by the reaction of about 1500 parts of tallow fatty acids, about 750 parts of a napthenic base neutral oil, about 1700 parts of barium hydrate and 320 parts of glacial acetic acid.

17. A grease composition as claimed in claim 14 containing about 5% to about 50% of a gelling agent produced by the reaction of 3 parts of lithium hydroxide, 20 parts of water, and 20 parts of hydrogenated castor oil.

18. A grease composition as claimed in claim 14 containing about 5% to about 50% of aluminum stearate as the gelling agent.

19. A grease composition as claimed in claim 14 containing about 5% to about 50% of chemically modified bentonite as the gelling agent.

References Cited

UNITED STATES PATENTS

| | | | |
|---|---|---|---|
| 2,427,272 | 9/1947 | Fuller et al. | 252—55 |
| 2,744,872 | 5/1956 | Nelson | 252—55 |
| 2,753,307 | 7/1956 | Foehr et al. | 252—55 |
| 3,095,375 | 6/1963 | Pitman. | |

DANIEL E. WYMAN, Primary Examiner

I. VAUGHN, Assistant Examiner

U.S. Cl. X.R.

252—32.7, 37, 40.5, 42, 46.6, 48.2, 48.6, 55, 73, 75, 78, 79

UNITED STATES PATENT OFFICE
CERTIFICATE OF CORRECTION

Patent No. 3,455,825                                             July 15, 1969

Franklin I. L. Lawrence et al.

It is certified that error appears in the above identified patent and that said Letters Patent are hereby corrected as shown below:

Column 6, line 31, "prosphoric" should read -- phosphoric --. Column 8, TABLE 1, in the heading to the third column, line 1 thereof, "100" should read -- 210 --. Column 13, TABLE 12, in the heading to the second column, line 1 thereof, "150" should read -- 100 --. Column 16, line 64, "hte" should read -- the --. Column 18, line 20, insert "EXAMPLE XXX" as a heading; line 25, after "di-2-ethylhexyl adipate" insert a period; line 58, "173" should read -- -173 --. Column 19, lines 33 and 35, "nonly", each occurrence, should read -- nonyl --; line 42, "contaninig" should read -- containing --; line 62, after "resins" insert a comma. Column 21, TABLE I, first column, line 14 thereof, "uours" should read -- hours --. Column 22, line 46, "entained" should read -- entailed --; line 47, after "temperature" insert -- of --. Column 23, line 1, before "blowing" insert -- a --; line 41, "abort" should read -- about --. Column 24, line 67, "combinde" should read -- combined --.

Signed and sealed this 9th day of June 1970.

(SEAL)
Attest:

EDWARD M. FLETCHER, JR.                          WILLIAM E. SCHUYLER, JR.
Attesting Officer                                             Commissioner of Patents